(12) United States Patent
Bucknor et al.

(10) Patent No.: US 8,496,561 B2
(45) Date of Patent: Jul. 30, 2013

(54) FLUID COUPLING FOR A HYBRID POWERTRAIN SYSTEM

(75) Inventors: Norman K. Bucknor, Troy, MI (US);
Anthony L. Smith, Troy, MI (US);
Yongsheng He, Sterling Heights, MI (US); Hong Yang, Rochester Hill, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/185,680

(22) Filed: Jul. 19, 2011

(65) Prior Publication Data

US 2013/0023379 A1    Jan. 24, 2013

(51) Int. Cl.
*B60W 10/02* (2006.01)
*B60W 10/06* (2006.01)
*B60W 10/08* (2006.01)

(52) U.S. Cl.
USPC .............................................. 477/5

(58) Field of Classification Search
USPC ............................................ 477/5
See application file for complete search history.

(56) References Cited

U.S. PATENT DOCUMENTS

| | | | |
|---|---|---|---|
| 2003/0153428 A1* | 8/2003 | Kitano et al. | 477/5 |
| 2004/0127327 A1* | 7/2004 | Kahlon et al. | 477/5 |
| 2008/0312034 A1 | 12/2008 | Shultz et al. | |
| 2009/0071784 A1 | 3/2009 | Combs et al. | |
| 2011/0086739 A1* | 4/2011 | Kajigai et al. | 477/5 |

* cited by examiner

*Primary Examiner* — Edwin A Young

(57) ABSTRACT

A hybrid powertrain system includes an internal combustion engine, an electric machine coupled to a transmission, a fluid coupling including an impeller and a turbine wherein the impeller is mechanically coupled to a rotatable member of the electric machine and the turbine is mechanically coupled to a rotatable member of the internal combustion engine. The fluid coupling is effective to fluidically couple torque from the electric machine to the internal combustion engine when the impeller and turbine are not mechanically locked.

14 Claims, 2 Drawing Sheets

FLUID COUPLING FOR A HYBRID POWERTRAIN SYSTEM

TECHNICAL FIELD

This disclosure is related to powertrain systems.

BACKGROUND

The statements in this section merely provide background information related to the present disclosure. Accordingly, such statements are not intended to constitute an admission of prior art.

Known powertrain architectures include torque-generative devices that generate and transfer torque via a torque transmission device to a driveline including one or more drive wheels for traction to propel a vehicle. Torque-generative devices may include, e.g., an internal combustion engine and/or torque machine(s) powered by non-fossil fuel. The torque machine(s) may use non-fossil fuels including, e.g., stored electric energy, stored hydraulic energy, and stored pneumatic energy, to generate tractive torque. The torque machine(s) may transform vehicle kinetic energy that is transmitted through the drive wheels to energy that is storable in an energy storage device.

Known hybrid powertrain systems are configured to stop and start the internal combustion engine during ongoing powertrain operation using autostop and autostart control schemes. Known hybrid powertrain systems may use a separate starter motor, or alternatively, use the torque machine to provide torque to spin and start the engine. Using the torque machine to provide torque to spin and start the engine may include gradually applying a torque transfer clutch while spinning the torque machine to spin the engine. This process consumes a substantial amount of power from the torque machine, and requires a calibrated control scheme to control operation of the torque transfer clutch. Torque spikes associated with engine cylinder compression and firing may be directly transferred to the torque machine.

SUMMARY

A hybrid powertrain system includes an internal combustion engine, an electric machine coupled to a transmission, a fluid coupling including an impeller and a turbine wherein the impeller is mechanically coupled to a rotatable member of the electric machine and the turbine is mechanically coupled to a rotatable member of the internal combustion engine. The fluid coupling is effective to fluidically couple torque from the electric machine to the internal combustion engine when the impeller and turbine are not mechanically locked.

BRIEF DESCRIPTION OF THE DRAWINGS

One or more embodiments will now be described, by way of example, with reference to the accompanying drawings, in which.

DETAILED DESCRIPTION

Figure 1:
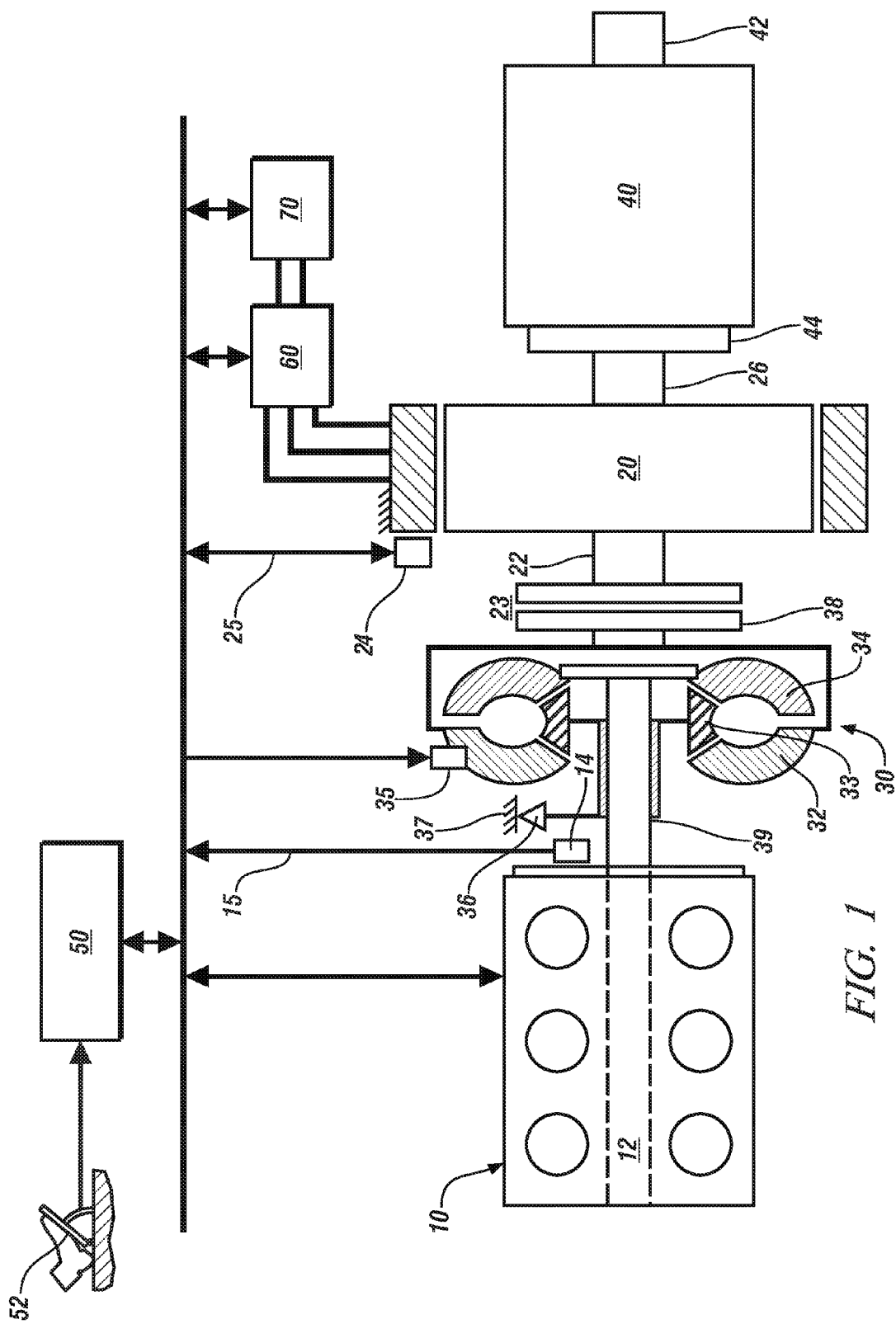
FIG. 1 schematically illustrates a hybrid powertrain system including an internal combustion engine, a torque converter, a torque machine, and a transmission device configured to transfer torque to a driveline in accordance with the disclosure.

Referring now to the drawings, wherein the showings are for the purpose of illustrating certain exemplary embodiments only and not for the purpose of limiting the same, FIG. 1 schematically illustrates a hybrid powertrain system 100 including an internal combustion engine 10, a torque machine 20, a torque converter 30, and a transmission device 40 configured to transfer torque to a driveline including one or more drive wheels. The internal combustion engine 10, the torque machine 20, the torque converter 30, and the transmission device 40 series configured.

The powertrain system 100 is configured to generate and transfer torque to a vehicle driveline, including propulsion torque for vehicle acceleration and reactive torque for vehicle deceleration. The transferred torque may originate from either or both the torque machine 20 and the internal combustion engine 10 via the transmission 40. Operation of the powertrain system 100 includes engine-off operation and engine-on operation, including executing engine autostop and autostart control schemes. The engine-off operation is coupled with powertrain operation wherein the tractive and reactive torques may be provided exclusively by the torque machine 20.

As illustrated, the engine 10 includes a crankshaft 12 that extends therefrom. The crankshaft 12 rotatably couples to a second rotating member 39 of the torque converter 30, which is a fluidic torque coupling device. The torque converter 30 includes a first rotating member 38 that couples to the torque machine 20 via a starting clutch 23 in one embodiment. The internal combustion engine 10 preferably includes a fuel injection system and may include a spark ignition system to fuel and fire the engine 10 during operation, including during engine starting and autostarting. A crank sensor 14 is configured to monitor rotational position and speed of the crankshaft 12 and generates a first signal Ne 15.

The torque machine 20 is a non-fueled torque generative device. In one embodiment the torque machine 20 is a multiphase electric motor/generator that electrically connects to a high-voltage power source 70 via an electric power inverter 60. A second sensor 24 is configured to monitor rotational position and speed of the torque machine 20 and generate a second signal Nm 25 for feedback and control. In one embodiment the second sensor 24 is a resolver. The torque machine 20 includes a rotating input member 22 and a rotating output member 26.

The torque converter 30 provides a fluidic coupling between the engine 10 and the torque machine 20 to transfer torque from the torque machine 20 to the engine 10. The torque converter 30 also provides a mechanical buffer between the engine 10 and the torque machine 20, acting to absorb torsional vibrations of the engine 10 including those associated with engine speed flaring during engine starting events. The torque converter 30 includes an impeller 32, a stator 33, a turbine 34, a controllable locking clutch 35 (i.e. torque converter clutch), and a stator brake 36. The impeller 32 of the torque converter 30 is configured to multiply torque transferred to the turbine 34 to spin the engine 10 when in an unlocked condition. The controllable locking clutch 35 is actuable to lock rotations of the impeller 32 and the turbine 34. The stator brake 36 is configured to ground rotation of the stator 33 to a transmission case 37 in one direction of rotation. The stator brake 36 may be, for example, a friction clutch element, a mechanical one-way clutch element, or another suitable actively or passively controlled device effective to ground the stator to effectively fluidically couple torque from the impeller to the turbine.

The impeller 32 rotatably couples to the first rotating member 38 of the torque converter 30, which couples to the input member 22 of the torque machine 20. The turbine 34 rotatably couples to the second rotating member 39, which couples to the crankshaft 12 of the engine 10. In one embodiment, the starting clutch 23 is configured to couple the first rotating member 38 to the input member 22 of the torque machine 20. As such, the torque converter 30 is arranged in a reverse fashion to effect fluidic torque transfer from the torque machine 20 to the engine 10 when the locking clutch 35 is deactivated, including during engine starting and autostarting.

Operation of the torque converter 30 may be characterized in terms of an input speed and input torque and an output speed and output torque. The torque converter input speed, i.e., the impeller 32 speed $N_P$, also referred to as the pump speed, is the rotational speed of the torque machine 20 when the starting clutch 23 is applied. The impeller torque $T_P$, also referred to as the pump torque, is the torque transferred from the torque machine 20 to the impeller 32 when the starting clutch 23 is applied. The torque converter output speed, i.e., the turbine 34 speed $N_T$ is the rotational speed of the engine 10, and the turbine torque $T_T$ is equal to the engine torque, which includes a cranking torque to spin the engine 10 during engine starting. Two ratios of interest include a torque ratio $R_T$, which is a ratio between the turbine torque and the pump torque, i.e., $T_P/T_T$ and a speed ratio $R_S$, which is a ratio between the turbine speed $N_T$ and the pump speed $N_P$, i.e., $N_P/N_T$.

One or more operator sensors 52 is arranged to monitor operator commands, and may include an accelerator pedal sensor, a brake pedal sensor, a transmission state selector (PRNDL), and others. A control module 50 monitors inputs from the aforementioned sensors and controls actuators to operate the hybrid powertrain system 100 in a manner that is responsive to the operator command(s). This includes controlling operation of the powertrain system to execute autostop and autostart commands. Sensors include the crankshaft sensor 14 configured to monitor rotational position and speed of the crankshaft 12 and generate the first signal Ne 15 representing the engine speed, which corresponds to the turbine speed $N_T$. Sensors include a second sensor 24 configured to monitor rotational position and speed of the torque machine 20 and generate the second signal Nm 25 representing torque machine speed, which corresponds to the impeller speed $N_P$.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

Figure 2:
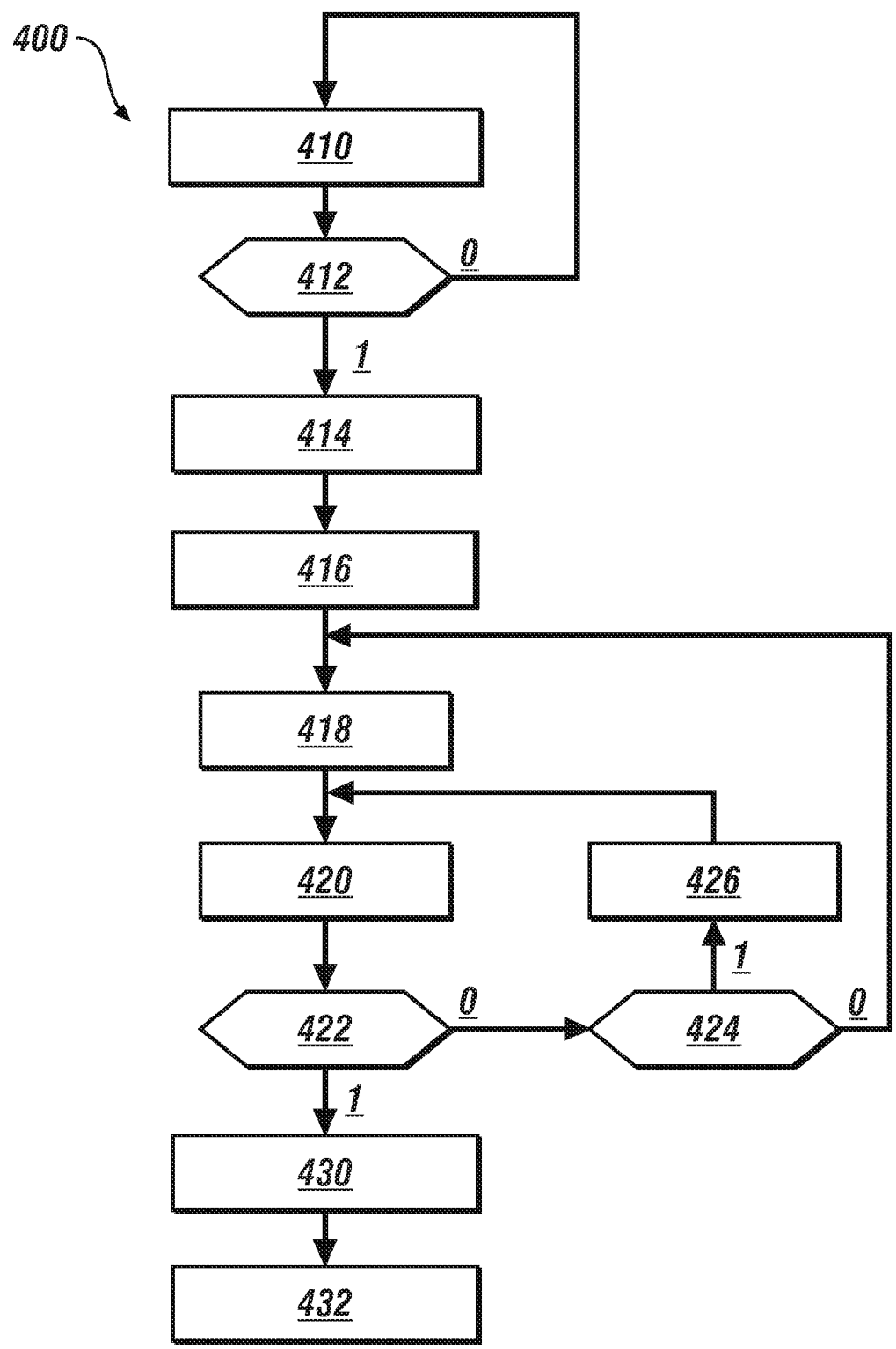
FIG. 2 schematically illustrates a control flowchart for executing an engine starting operation, including executing an engine autostart operation during ongoing powertrain operation in accordance with the disclosure.

FIG. 2 schematically shows a control scheme 400 flowchart for executing an engine starting operation, including executing an engine autostart operation during ongoing powertrain operation. The control scheme 400 is preferably reduced to one or more routines that are executed in the control module 50 to control operation of the hybrid powertrain system 100 described with reference to FIG. 1. Table 1 is provided as a key to FIG. 2 wherein the numerically labeled blocks and the corresponding functions are set forth as follows.

TABLE 1

| BLOCK | BLOCK CONTENTS |
| --- | --- |
| 410 | Monitor powertrain system operation |
| 412 | Command engine autostart? |
| 414 | Pressurize torque converter |
| 416 | Operate torque machine to spin impeller of torque converter |
| 418 | Apply starting clutch/Ramp up torque output of torque machine (MG Torque) |
| 420 | Monitor engine speed |
| 422 | Engine speed > minimum engine speed for firing? |
| 424 | MG Torque > threshold? |
| 426 | Ramp in torque converter clutch |
| 430 | Fuel/Fire engine |
| 432 | Apply/Lock torque converter clutch |

The control scheme 400 monitors the powertrain system operation, including monitoring sensor inputs and the operator command(s) (410). Monitored inputs preferably include the operator commands and a state of charge of the high-voltage power source 70.

The purpose of monitoring the powertrain system operation is to detect an engine autostart command (412). An engine autostart command may occur in response to an operator command, or in response to a change in the state of charge of the high-voltage power source 70 beyond a threshold, e.g., either a minimum or a maximum permissible state of charge.

Executing the engine autostart command includes initially pressurizing the fluid coupling of the torque converter 30 (414). Such operation is known, and is accomplished to prevent cavitation during operation.

Operation of the torque machine 20 is controlled to execute the engine autostart (416).

Torque output from the torque machine 20 is ramped up, i.e., increased to overcome inertia in the torque converter 30 and spin the impeller 32 of the torque converter 30 to multiply torque across the torque converter 30 and provide sufficient magnitude of torque to spin the engine 10. This includes activating the starting clutch 23 on powertrain systems so equipped (418). The commanded increase in the torque output from the torque machine 20 is a value that ramps up to the maximum cranking torque required to spin the engine 10, divided by a torque converter coupling torque ratio at a stall condition.

The engine speed is monitored (420), and compared with a minimum engine firing speed (422). The minimum engine firing speed is a minimum engine speed necessary to effectively start the engine 10, including fueling and firing the engine 10.

When the engine speed exceeds the engine firing speed (1), the control module 50 commands engine operations to fuel and fire the engine 10 (430). Subsequent to fueling and firing the engine 10, the locking clutch 35 is applied and commanded to a locked position (432), and operation of the powertrain system includes transferring torque from the engine 10 through the torque machine 20 to the transmission 40, and hence to the driveline.

When the engine speed is less than the predetermined engine firing speed (0), the control module 50 compares the torque output from the torque machine 20 with a torque threshold (424). The torque threshold is preferably associated with a cranking torque sufficient to spin and maintain the engine to the minimum firing speed.

When the torque output from the torque machine 20 is equal to or greater than the torque threshold (1) with the engine speed less than the predetermined engine firing speed, it is an indication that the torque multiplication across the torque converter 30 is saturated under present operating conditions, and the torque converter clutch is gradually applied to bring the speed ratio across the torque converter 20 to 1:1 (426). The torque output from the torque machine 20 is correspondingly modulated to reflect a decrease in torque multiplication across the impeller/turbine coupling within the torque converter 30.

When the torque output from the torque machine 20 is less than the torque threshold (0) with the engine speed less than the predetermined engine firing speed, operation continues, with continued ramping up of the torque output from the torque machine 20 (418).

The powertrain system configuration described herein may enable a powertrain architecture that uses a single torque machine, and may improve performance thereof. The powertrain system configuration described herein may enable a powertrain architecture that has no need for a separate starter motor. The powertrain system configuration using the single torque machine may improve vehicle drive quality and improve engine control during engine starting events with multiplied torque across the torque converter 30. The powertrain system configuration using the single torque machine may facilitate sizing the single torque machine based only upon driveline torque requirements, and may eliminate a need to size the single torque machine based upon driveline torque requirements and engine starting torque requirements.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A hybrid powertrain system, comprising:
an internal combustion engine;
an electric machine coupled to a transmission,
a fluid coupling including an impeller and a turbine, the impeller mechanically coupled to a rotatable member of the electric machine, the turbine mechanically coupled to a rotatable member of the internal combustion engine;
said fluid coupling effective to fluidically couple torque from the electric machine to the internal combustion engine when the impeller and turbine are not mechanically locked.

2. The hybrid powertrain system of claim 1, wherein the fluid coupling is a torque converter further comprising a stator.

3. The hybrid powertrain system of claim 2, wherein the torque converter is further effective to multiply the fluidically coupled torque from the electric machine to the internal combustion engine.

4. The hybrid powertrain system of claim 1, wherein the electric machine is configured to effect an engine autostart during ongoing operation of the powertrain system.

5. A method for controlling a hybrid powertrain system comprising an internal combustion engine coupled to a torque machine through a torque converter including an impeller, a turbine, a stator, and a torque converter clutch, the method comprising:
transferring torque produced by the torque machine coupled to the impeller of the torque converter to the internal combustion engine coupled to the turbine of the torque converter through a fluidic coupling of the impeller to the turbine during an engine start event.

6. The method of claim 5 further comprising increasing torque produced by the torque machine so long as the internal combustion engine remains below a predetermined minimum firing speed whereafter the engine is fueled and fired and the torque converter clutch is locked.

7. The method of claim 5 further comprising increasing torque produced by the torque machine so long as the internal combustion engine remains below a predetermined minimum firing speed and the torque produced by the torque machine remains below a predetermined torque sufficient to spin and maintain the engine to the minimum firing speed.

8. The method of claim 7 further comprising applying the torque converter clutch after the torque produced by the torque machine exceeds the predetermined torque sufficient to spin and maintain the engine to the minimum firing speed.

9. The method of claim 8 further comprising fueling and firing the engine after the internal combustion engine exceeds the predetermined minimum firing speed and thereafter locking the torque converter clutch.

10. The method of claim 5 further comprising fueling and firing the engine after the internal combustion engine exceeds a predetermined minimum firing speed and thereafter locking the torque converter clutch.

11. A hybrid powertrain system, comprising:
an internal combustion engine;
an electric machine;
a torque converter comprising an impeller coupled to the electric machine, a turbine coupled to the internal combustion engine, and a selectively engageable torque converter clutch;
a control module disengaging the torque converter clutch and rotating the electric machine to fluidically transfer torque through the torque converter to the internal combustion engine for the purpose of spinning the engine prior to fueling and firing the internal combustion engine.

12. The hybrid powertrain system of claim 11 wherein the control module further increases torque produced by the electric machine so long as the internal combustion engine remains below a predetermined minimum firing speed whereafter the engine is fueled and fired and the torque converter clutch is locked.

13. The hybrid powertrain system of claim 11 wherein the control module further increases torque produced by the electric machine so long as the internal combustion engine remains below a predetermined minimum firing speed and the torque produced by the electric machine remains below a predetermined torque sufficient to spin and maintain the engine to the minimum firing speed.

14. The hybrid powertrain system of claim 13 wherein the control module further applies the torque converter clutch after the torque produced by the electric machine exceeds the predetermined torque sufficient to spin and maintain the engine to the minimum firing speed.

* * * * *